Patented Sept. 13, 1932

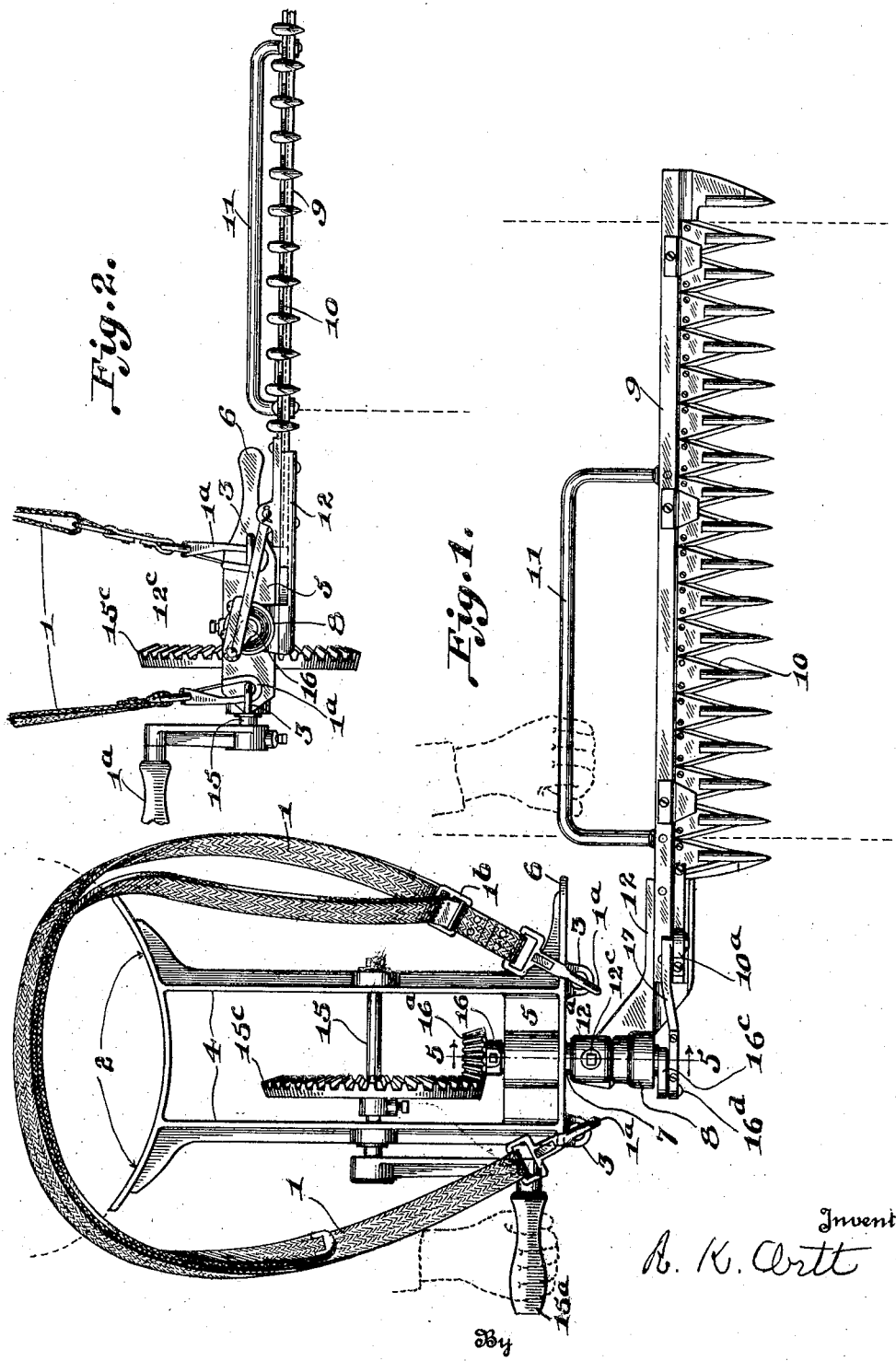

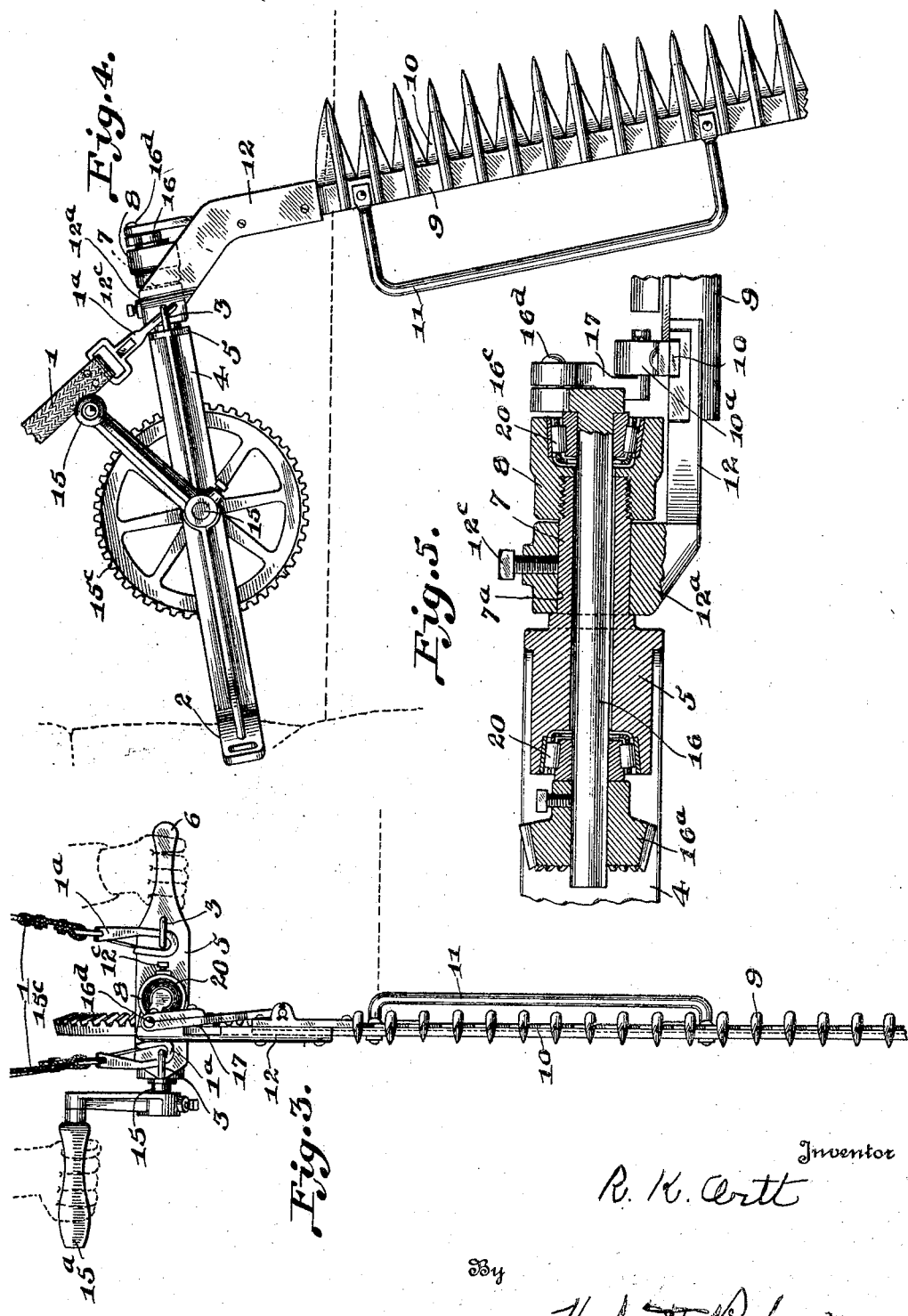

1,877,032

UNITED STATES PATENT OFFICE

ROWLEY K. ORTT, OF DIXON, ILLINOIS

HEDGE TRIMMER AND THE LIKE

Application filed October 23, 1929. Serial No. 401,669.

This invention relates to hedge trimmers and the like, and the objects and nature of the invention will be understood by those skilled in the art in the light of the following description of the accompanying drawings that show what I now believe to be the preferred mechanical expression or embodiment of my invention from among other forms, constructions and arrangements within the spirit and scope thereof.

An object of the invention is to provide a portable cutting apparatus for hedges and other uses to which adapted, exceedingly durable and rugged in structure and assembly, easy and convenient in operation, and capable of quick adjustment for cutting in vertical, horizontal and intermediate planes.

And a further object of the invention is to provide an improved cutter of the class described, that can be easily carried and actuated by the operator and wherein the cutting mechanism is carried by and adjustable with respect to a supporting frame by the utilization of improved operative connections between such frame and the cutting mechanism assembly.

With the foregoing and other objects in view, my invention consists in certain novel arrangements, combinations, or features, and structures, as more fully and particularly described and specified hereinafter.

Referring to the accompanying drawings, forming part hereof:

Fig. 1 is a top plan showing the trimmer adjusted for horizontal operation as for trimming a hedge top with the right hand of the operator shown by dotted lines operating the gearing actuating handle and the left hand, shown by dotted lines, applied to the cutter bar.

Fig. 2 is a front elevation, shown on a smaller scale than Fig. 1.

Fig. 3 is a front elevation showing the trimmer adjusted for operation in a vertical plane for cutting the side of a hedge, the right and left hands of the operator being shown by dotted lines applied to the crank handle and front frame handle, respectively.

Fig. 4 is a side elevation of the trimmer in the adjustment of Fig. 3.

Fig. 5 is a detail enlarged section on the line 5—5, Fig. 1.

In the embodiment shown, I provide a carrying frame designed to be supported by the operator in an approximately horizontal forwardly projecting position, as the operator advances beside and longitudinally of the hedge that is to be trimmed at the top and both sides. The cutting mechanism employed in this embodiment is of the reciprocatory cutter type embodying an elongated straight cutter bar including a longitudinal reciprocatory knife bar. This cutter bar is coupled to and supported from the carrying frame to project laterally therefrom and is adjustable or swingable around said frame in a plane approximately perpendicular to the longitudinal axis of said frame for operation in any desired angular position with respect to the frame. The frame is provided with operating mechanism for driving the knife bar and this operating mechanism has actuating connection with the knife bar, and in the particular embodiment shown, the operating mechanism and said operating connection are capable of operatively reciprocating the knife bar when the cutter bar is in any angular position to which it can be adjusted with respect to the carrying frame.

In the example shown, I provide a carrying frame that is longitudinally elongated with the cutter bar coupled to or hung from the outer or front end of the frame, and with the rear or inner end of the frame of a transversely concaved or saddle like formation 2, to fit and bear against the torso or body of the operator, and with a supporting strap 1, coupled to the outer or front end of the frame and arranged to pass around a shoulder portion of the body or torso of the operator and extend forwardly and downwardly therefrom to the front or outer end of the frame to uphold the same and the cutter bar at the desired elevation. As a convenient means of applying the supporting strap to the frame, I show the opposite ends of the strap equipped with snap hooks 1a, and the transverse front end of the frame formed or provided with widely spaced forwardly projecting rigid eyes 3, to receive said hooks, whereby the strap can be easily coupled to and detached from the frame. The shoulder strap 1, is preferably readily adjustable in length to support the carrying frame at the desired elevation determined by the height of the operator and the level to which the hedge is to be trimmed. This adjustability of the shoulder strap length can be provided for in various ways, as by forming the strap in two lengths connected by a bucket 1b, connecting the strap lengths.

The carrying frame can be cast in one piece variously formed and constructed, although I happen to show the same of oblong open center form having parallel spaced longitudinal side bars 4, connected at their rear ends by the laterally extended concaved cross portion or saddle 2, and at their front ends connected by the front cross portion 5, carrying front eyes 3, and extended laterally to provide rigid handle 6.

The front end 5, of this frame is formed or provided with a rigid strong forwardly projecting post, stud or stub shaft 7, rigid with the frame and alined with the central longitudinal axis of the frame. This stud 7, is formed with an exteriorly cylindrical bearing portion 7a, and outwardly beyond said bearing portion 7a, said stud is formed to receive a suitable stop 8, after the cutter bar has been applied to the stud, to retain the cutter bar against outward separation from the stud, as hereinafter explained.

The cutter bar, in the example shown, consists of a long straight finger bar 9, longitudinally grooved and with the fingers slotted, in the usual or any other suitable manner to receive the longitudinal reciprocatory complementary knife bar 10, confined thereto to reciprocate longitudinally thereof in performing the cutting operation.

This cutter bar is equipped with a longitudinally arranged handle 11, arranged at the rear thereof and having its forwardly extending ends fixed to the finger bar. The inner end of the finger bar, is provided with a longitudinal rigid strong extension, shoe or arm 12, rearwardly deflected at its free end with its rear extremity vertically enlarged and bored to form a hub or bearing sleeve 12a, having its longitudinal axis perpendicular or at right angles to the longitudinal axis of the cutter bar and in line with the direction of forward movement of the cutter bar when in operative position.

This bearing hub 12a, is formed to slip onto the center forwardly projecting stud 7, of the carrying frame, and to more or less snugly and rotatively fit the journal portion 7a, of said stud, to which said bearing hub is confined by application of the stop, in this instance enlarged head 8, to the outer or free end of said stud.

Means is preferably provided for normally clamping the hub 12a, to said stud against rotation on the stud, to normally hold the cutter bar at the desired angular position with respect to the carrying frame. For instance, I show the hub provided with a set or clamping screw 12c, for this purpose. This screw extends radially into the bore of the hub through a radial screw threaded hole in which it is adjustable to clamp and release the hub. The screw has an accessible exterior head by which it can be rotated. When the screw is rotated to free the hub the cutter bar can be swung or rotated completely around the stud, or throughout a range of 360°, or any fraction thereof, to the desired angular position or for either right or left hand operation of the apparatus. When the cutter bar has been swung to the desired angular position, the set screw 12c, can be tightened to lock the cutter bar hub to the stud, although I do not wish to so limit the generic feature of my invention.

Various operating mechanisms can be employed for reciprocating the knife bar, although in the example illustrated, I show rotary driving shaft 15, arranged transversely of the carrying frame intermediate its front and rear ends and at one end equipped with operating crank handle 15a, and rotary eccentric or crank shaft 16, arranged centrally and longitudinally of the carrying frame and geared to and driven by the driving shaft 15, through the medium of gear 15c, and meshing pinion 16a, and at its forward end having a crank or eccentric driving connection with the reciprocatory knife bar.

The drive shaft 15, is shown with the crank handle 15a, at the exterior of the right hand side of the frame, for right hand operation, with the shaft extending through both side bars of the carrying frame, suitable usually adjustable roller or ball bearings being preferably provided. The gearing 15c, 16a, is shown within the center opening of the carrying frame. The carrying frame is shown with a central longitudinal hole or bore, for shaft 16, through its outer or front cross portion 5, and centrally and longitudinally through the rigid projecting stud 7, and the stop head 8, thereof. The longitudinal rotary shaft 16, extends longitudinally through said bore and projects forwardly beyond head 8, and at its forward end is operatively coupled to the inner or adjacent end of the knife bar 10, by a crank and pitman connection to reciprocate the same. For instance, I show the front end of shaft 16, provided with crank arm 16c, having crank pin 16d, operatively and pivotally coupled to the bearing eye 10a, of knife bar 10, by pitman 17, in the usual or any other suitable manner, in front of the shaft and stud and in front or at the outer side of the shoe or arm 12.

The shaft 16, is preferably carried by or mounted in suitable adjustable roller or ball bearings 20, in the frame and its stud, and preferably adjustable for taking up looseness through the medium of end head 8. This head 8, is hence, preferably, secured on the outer end of the stud 7, by means of meshing screw threads, so that the bearings can be adjusted by partial rotation of the head on the stud. The outer portion of the stud is hence longitudinally and exteriorly screw threaded to longitudinally and exteriorly receive the head 8, which is in the form of an interiorly screw threaded nut or sleeve.

When the top of a hedge is to be trimmed, by an operator who employs his right hand to actuate the crank handle 15a, the cutter bar is swung on the strong center frame stud 7, to a position extending laterally toward the left from stud 7, in a plane approximately parallel with the plane of the frame 2, 4, 5, and the saddle 2, of the frame is fitted to the body and the shoulder strap applied over the left shoulder portion of the body and adjusted in length to support the frame and cutter bar at the required elevation. The operator grasps the cutter bar handle 11, with the left hand to aid in maintaining the cutter bar in the desired position, and operates the crank handle 15a with his right hand while advancing along the hedge during the trimming operation.

When the sides of a hedge are to be trimmed, the cutter bar is swung on the rigid frame stud to depend therefrom at the desired position, and is then locked by screw 12c, for cutting the hedge vertically or at a desired inclination from the vertical. The operator then grasps the rigid lateral front end frame handle 6, and while advancing beside the hedge operates the cutter by rotating handle 15a.

The carrying frame 2, 4, 5, is relatively flat, and reversible and hence can be carried in operative position either side up, and the operating parts are arranged accordingly, and hence where an operator desires to employ the left hand for rotating crank handle 15a, the frame is reversed to present handle 15a, on the left side, and the cutter bar is swung on stud 7, to project horizontally to the right with handle 11 grasped by the right hand for trimming the hedge top, or to depend in the proper position for trimming the hedge side while the right hand grasps the frame handle 6, which then projects laterally to the right. The supporting strap will hang from the right shoulder of the operator when the frame is reversed to present the handle 15a, at the left side of the machine.

The operative driving connection from the longitudinal shaft 16, to the knife bar 10, whereby the rotary motion of the shaft is converted into the rectilinear motion of the knife bar, is so constructed and arranged as to freely permit rotation of either the carrying frame on its longitudinal axis with respect to the cutter bar, or rotation of the cutter bar on the stud 7, as an axis with respect to the carrying frame, either the shafts and gearing being free to rotate or the knife bar being free to reciprocate.

It is evident that various changes, modifications, and variations might be resorted to without departing from the spirit and scope of my invention and hence I do not wish to limit myself to the approximate disclosure hereof.

What I claim is:

1. A portable trimmer embodying a supporting frame adapted to extend forwardly from the body and at its rear end formed to fit the body and at its front end having a forwardly projecting rigid stud; a shoulder strap coupled to the front end of said frame for supporting the same; a cutter bar including reciprocatory knife bar extending laterally from said frame stud and supported thereby and rotatable thereon clear of said frame for adjustment to any angular position around the stud; and actuating mechanism carried by and extending from said frame through said stud to said knife bar for reciprocating the same.

2. A hedge trimmer embodying a carrying frame at its inner end formed to fit the body and at its outer end having spaced eyes; a supporting shoulder loop adjustable in length and having end hooks adaptable to said eyes; a cutter bar extending laterally from said frame and coupled to the front end thereof for adjustment to and from approximate horizontal and approximate vertical positions with respect to said frame, said cutter bar including a longitudinally reciprocatory knife bar; and operating mechanism carried by said frame and having operating connection for reciprocating said knife bar whatever the angular position of the cutter bar with respect to said frame.

3. A trimmer including a carrying frame formed to bear rearwardly against the operator's body and to extend forwardly from the body and at its front end having a supporting loop to fit over and extend downwardly and forwardly from the shoulder portion of the operator's body, said frame at its front end having a lateral handhold; a cutter bar extending laterally from the front end of said frame and coupled thereto to swing for vertical adjustment with respect to the frame on a fixed axis, said cutter bar having a fixed rear hand-hold, said cutter bar including cutter knives; and operating means carried by said frame and operatively coupled to said knives.

4. A hedge trimmer including a carrying frame concaved at its rear end to bear rearwardly against the body of the operator, a supporting loop adjustable in length and at its spaced ends coupled at spaced points to the front end of said frame to uphold the same from the shoulder portion of the operator, said front end of the frame having a handle; a cutter bar including a reciprocatory knife bar, said cutter bar having supporting connection with the front end of said frame forwardly beyond and clear of said front end including means whereby said bar can be adjusted with respect to the frame for trimming the tops and sides of hedges, said cutter bar having a rear handle, and means for reciprocating said knife bar.

5. A trimmer for hedges and the like, including a carrying frame reversible for right and left hand operation; a cutter bar extending laterally from and carried by said frame and swingable with respect thereto and clear thereof completely around a forwardly projecting bar-supporting axis alined with the center longitudinal axis of said frame for adjustment to any angular position with respect to said frame; said cutter bar including a knife bar; and operating mechanism for said knife bar for reciprocating the same when the cutter bar is in any angular position to which it is swingable with respect to the frame, said mechanism having an operating handle accessible for actuation when said frame is in position for right hand operation and when said frame is reversed for left hand operation.

Signed at Dixon, Illinois, this 16th day of October, 1929.

ROWLEY K. ORTT.